US008174803B2

(12) United States Patent
Schild et al.

(10) Patent No.: US 8,174,803 B2
(45) Date of Patent: May 8, 2012

(54) SYSTEM FOR CREATING A MAGNETIC FIELD VIA A SUPERCONDUCTING MAGNET

(75) Inventors: Thierry Schild, Orsay (FR); André Donati, Orsay (FR); Armand Sinanna, Guyancourt (FR); Pascal Tixador, Grenoble (FR); Stéphane Bermond, Grenoble (FR)

(73) Assignees: Commissariat à l'Énergie Atomique et aux Énergies Alternatives, Paris (FR); Centre National de la Recherche Scientifique, Paris (FR)

( * ) Notice: Subject to any disclaimer, the term of this patent is extended or adjusted under 35 U.S.C. 154(b) by 119 days.

(21) Appl. No.: 12/742,296

(22) PCT Filed: Oct. 27, 2008

(86) PCT No.: PCT/FR2008/051937
§ 371 (c)(1), (2), (4) Date: Jul. 29, 2010

(87) PCT Pub. No.: WO2009/063150
PCT Pub. Date: May 22, 2009

(65) Prior Publication Data

US 2010/0295641 A1 Nov. 25, 2010

(30) Foreign Application Priority Data

Nov. 12, 2007 (FR) ..................................... 07 58969

(51) Int. Cl.
*H02H 7/00* (2006.01)

(52) U.S. Cl. ......................................... 361/19; 361/141

(58) Field of Classification Search .................... 361/19, 361/141
See application file for complete search history.

(56) References Cited

U.S. PATENT DOCUMENTS

| | | | | |
|---|---|---|---|---|
| 4,855,859 | A * | 8/1989 | Tixador et al. | 361/19 |
| 5,210,674 | A * | 5/1993 | Yamaguchi et al. | 361/19 |
| 6,624,732 | B2 | 9/2003 | Biltcliffe et al. | |
| 2003/0057942 | A1 | 3/2003 | Biltcliffe et al. | |
| 2004/0082482 | A1 | 4/2004 | Rey | |
| 2004/0263165 | A1 | 12/2004 | Shen et al. | |
| 2006/0250204 | A1 * | 11/2006 | Spreiter et al. | 335/216 |
| 2007/0024404 | A1 | 2/2007 | Westphal et al. | |

FOREIGN PATENT DOCUMENTS

| | | |
|---|---|---|
| DE | 101 56 234 C1 | 2/2003 |
| EP | 0 299 325 B1 | 1/1989 |
| FR | 1437233 | 4/1966 |
| FR | 2 661 775 | 11/1991 |
| WO | WO 96/30990 | 10/1996 |

* cited by examiner

*Primary Examiner* — Stephen W Jackson
*Assistant Examiner* — Terrence Willoughby
(74) *Attorney, Agent, or Firm* — Pillsbury Winthrop Shaw Pittman, LLP

(57) ABSTRACT

The present invention relates to a system (100) for creating a magnetic field via a superconducting magnet (102) intended to produce said magnetic field. The system (100) according to the invention comprises a first branch including the superconducting magnet (102) formed by a coil inductance (L') in series with a residual resistance ($R'_2$), a second branch comprising a protection resistance ($R'_3$) and a third branch comprising a power source (103). Furthermore, the system comprises a fourth branch formed by a resistance ($R'_1$) mounted in series with a current-limiting superconducting device (106) switching from a low-resistance state to a high-resistance state when the current passing therethrough exceeds a breaking current, said first, second, third and fourth branches being mounted in parallel.

23 Claims, 6 Drawing Sheets

SYSTEM FOR CREATING A MAGNETIC FIELD VIA A SUPERCONDUCTING MAGNET

CROSS-REFERENCE TO RELATED APPLICATIONS

This is the U.S. National Stage of PCT/FR2008/051937, filed Oct. 27, 2008, which in turn claims priority to French Patent Application No. 0758969, filed Nov. 12, 2007, the entire contents of both applications are incorporated herein by reference in their entireties.

The present invention relates to a system for creating a magnetic field via a superconducting magnet intended to produce said magnetic field. A superconducting magnet is formed by a superconducting coil (for example, a Niobium-Titanium composite) maintained at a temperature such that the superconducting state of the material constituting the coil is ensured (for example to 4.2 K in a bath of liquid helium at atmospheric pressure for a Niobium-Titanium composite subjected to a field typically less than 10 T). The zero electrical resistance thus reached enables very high magnetic field intensities to be created within the limits of capabilities to transport superconducting materials. The invention finds a particularly interesting application in the field of nuclear magnetic resonance (NMR) and magnetic resonance imaging (MRI).

Applications in the field of NMR and MRI necessitate magnetic fields that are intense (that may reach several tens of tesla) and stable over time.

A known configuration consists of utilizing a short-circuited superconducting magnet: This mode of operation, called persistent mode, is carried out by the disconnection of the electrical power supply of the coil and the presence of a superconducting switch forming a closed circuit with the coil. A superconducting switch formed by a superconducting composite coupled with a heating element (subsequently designated also by the term heater) is a thermal switch that has zero resistance when the heater associated with it is off, the switch is then known as “closed,” and high resistance compared to the other resistances of the circuit when the heater is turned on, the switch is then known as “open.” The resistance of the switch is that of the resistive matrix of the superconducting composite above a temperature known as the critical temperature, and is near zero below this temperature. The equivalent electrical circuit thus formed is composed of the inductance of the magnet, typically several hundred henrys, the resistance of the magnet and the resistance of the short-circuit formed by, the superconducting switch.

However, this solution presents certain difficulties.

In fact, so that the magnetic field drift in time is low, typically less than 0.05 ppm/h, it is necessary that the resistances of the circuit are extremely low, typically less than 1 nΩ for a magnet of 100H.

Such being the case, for reasons connected to magnet technology (utilization of a high critical temperature superconductor), or accidental causes (defect on a junction inside the magnet coil), the residual resistance of the magnet may be greater than the value enabling operation of the system in persistent mode.

A known solution to this problem is described in document U.S. Pat. No. 6,624,732 and consists of compensating for the time drift of the magnet. FIG. 1 illustrates the electrical circuit enabling implementation of this compensation. The electrical circuit 1 comprises:

- a first branch comprising a superconducting electromagnet 2 formed by a coil inductance L in series with a resistance $R_2$ representing the residual resistance of the magnet preventing operation in persistent mode,
- a second branch formed by a superconducting thermal switch $S_1$ in series with a resistance $R_1$.
- a third branch formed by a current power supply 3.

The three branches are mounted in parallel.

The value of resistance $R_1$ is in a ratio from 10 to 1000 times the value of resistance $R_2$.

Circuit 1 operates according to the two following operation modes:

- a magnet charge mode: when injection of current by supply 3 into coil L of the magnet starts, the superconducting switch $S_1$ is open;
- a normal operation mode (or nominal mode); when the current in the magnet coil has reached its nominal value (stabilized current), the superconducting switch $S_1$ is closed; after closing this switch $S_1$, instead of disconnecting the power supply 3, it is left connected to coil L of the magnet to compensate for losses; the current is injected into the switch $S_1$, until the field produced by the magnet has been stabilized to the desired value.

To limit the time drift due to the current power supply 3, the first resistive branch formed by $R_1$ is thus added so that all power supply pulsations will pass into this branch, and the current in the coil will be perfectly continuous. If $I_{op}$ designates the nominal running current of the magnet and ΔI designates the current circulating in resistance $R_1$, stabilization is obtained by the relation: $R_2 \cdot I_{op} = R_1 \cdot \Delta I$.

However, implementation of the circuit such as described in document U.S. Pat. No. 6,624,732 also poses certain difficulties.

Thus, the magnet may locally lose its superconducting properties and transit into a dissipative mode (“quench” of the magnet). Such a transition implies that the latter is protected on itself (i.e., that the resistance developed in the magnet during the transition is sufficient to discharge the current in the magnet at a rate such that heating of the conductor remains limited). However, for technological reasons such as the very high energy stored in the magnet (typically over 100 MJ), it is sometimes difficult to apply this type of protection. The Joule effect that is generated may then lead to abnormal heating of the magnet and thus to a definitive deterioration of its superconducting properties.

A solution to this problem consists of adding an additional branch to the terminals of the magnet and power supply constituted of a protection resistance; such a circuit 10 is illustrated in FIG. 2.

The electric circuit 10 comprises (elements common to circuit 1 of FIG. 1 bear the same references):

- a first branch comprising an electromagnet 2 formed by a coil inductance L in series with a resistance $R_2$ representing the residual resistance of the magnet preventing operation in persistent mode,
- a second branch formed by a superconducting thermal switch $S_1$ in series with a resistance $R_1$,
- a third branch formed by a current power supply 3 mounted in series with a cut-off member $S_2$ (and possibly a redundant cut-off member $S_3$),
- a fourth branch formed by a resistance $R_3$, known as a protection resistance, that may be situated either in the cryostat chamber of the magnet or outside at ambient temperature.

In case of quench, the cut-off member $S_2$ (and possibly $S_3$) is open so that coil L is discharged in resistance $R_3$ wherein the value is optimized to obtain a rapid discharge without deterioration of the magnet. The current decay rate is then determined by the value of the protection resistance.

As mentioned above, the superconductive switch $S_1$ in series with $R_1$ must be closed, i.e., at low impedance in comparison with other resistances of the circuit, in normal operation with stabilized current.

On the other hand, this same switch $S_1$ must be open (i.e., at high impedance in comparison with other resistances of the circuit ($R_1$, $R_2$, $R_3$)) during the charge/discharge of the coil L and during the protection of the magnet (rapid discharge of coil L in $R_3$).

In fact, so that the stabilization process functions, a resistance $R_1$ presenting a value much less than the protection resistance $R_3$ and a value greater than that of $R_2$ must be utilized (in a ratio from 10 to 1000 times the value of resistance $R_2$, as already mentioned above). To limit thermal losses, resistance $R_1$ must be such that the Joule power dissipated in the stabilization regime remains low, typically less than several milliwatts.

In case of rapid discharge (protection mode), the magnet current must flow into $R_3$, since it is the only resistance sized to receive high energy and it controls the current decay rate to protect the magnet: Switch $S_1$ must then be open.

Implementation of configuration 10 of FIG. 2 consequently presents several difficulties:

First difficulty: The superconducting switch $S_1$ has maintained a predominant role in securing the operation of the magnet since in the absence of opening, the current in the magnet does not decrease at the expected rate. Such being the case, this delay may cause abnormal heating of the coil, leading to irreversible deterioration of its superconducting properties, Second difficulty: In case of discharge of the magnet, the voltage at the terminals of the superconducting switch $S_1$ may be several hundreds or even thousands of volts. The energy deposited during discharge in, the switch $S_1$ is therefore very high. In order to prevent deterioration of switch $S_1$, the mass of the latter therefore, must be such that its heating remains limited to typically less than 100 K. Therefore, the superconducting switch $S_1$ is very difficult to make with relation to switches from the prior art (that support 1000 A under some volts) and is necessarily voluminous and heavy.

Third difficulty: During current charge and discharge operations of the magnet, the switch $S_1$ must be maintained in the resistive state by using its electrical heater (usually several hundred milliwatts). Such being the case, due to the size required by the high discharge voltage, the power necessary to maintain it open is several watts, which is very demanding for cryogenic systems ensuring the regulation of magnet temperature.

A known solution consists of replacing the superconducting thermal switch with a mechanical switch. A configuration of this type is described in document US2007/0024404. This solution provides a provisional technological response to the second and third difficulties mentioned above but leaves the first difficulty unresolved, connected to the fact that the reliability of the magnet protection depends on the reliability of the switch and its control circuit.

In this context, the present invention aims to provide a system for creating a magnetic field aiming to be free from the three difficulties mentioned above while ensuring an effective charge of the coil, very low drift of the magnetic field in time and rapid discharge without deterioration of the magnet in case of quench.

For this purpose, the invention proposes a system for creating a magnetic field including:

a first branch comprising a superconducting magnet intended to produce said magnetic field, said magnet being formed by a coil inductance in series with a residual resistance;

a second branch comprising a resistance, said protection resistance, a third branch comprising a power supply;

said system comprising a fourth branch formed by a resistance mounted in series with a current-limiting superconducting device switching from a low-resistance state to a high-resistance state when the current passing therethrough exceeds a breaking current, said superconducting device having an inductance at least $10^5$ times less than that of the coil, and said first, second, third and fourth branches being mounted in parallel, said system presenting at least three modes of operation:

a first mode of operation, known as charge mode or discharge mode of the magnet, in which:

said power supply is connected to said magnet so as to increase or reduce the current in the magnet, said current limiter is in its high-resistance state;

a second mode of operation, known as normal mode of operation, in which:

said power supply is connected to said magnet, said limiter is in its low-resistance state;

a third mode of operation, known as the rapid discharge mode of the magnet in said protection resistance, in which:

said power supply is disconnected from said magnet, said limiter is in its high-resistance state;

Activation of the state of said limiter in said three operation modes is done in a passive manner without resorting to an external command.

The limiter must have an inductance that is as low as possible, on the one hand to ensure the stabilization function as described in U.S. Pat. No. 6,624,732, and on the other hand to minimize the transition time between the "closed" state and the "open" state. With the experimental devices utilized, it is on the order of several microhenry.

The superconducting material is chosen such that its critical temperature is greater than the temperature of the medium in which it is placed.

During the rapid discharge phase of the magnet in the protection resistance, the temperature of the superconductor wire forming said limiter passes by a maximum value called $T_{max}$. This value must be such that the limiter is not deteriorated if the superconductor wire constituting it reaches, locally or in totality, the value $T_{max}$. This must at least be less than the temperature from, which the superconducting properties of the superconductor wire chosen are not deteriorated, for example around 300° C. for NbTi. In the choice of this value, it is sometimes necessary to take the effect of the mechanical deformation connected to expansion of the materials into account. In order to be free from this effect, sometimes a $T_{max}$ of less than 100 K is chosen since below this value, most materials are no longer deformed under the effect of a temperature variation.

Superconducting limiter is understood to refer to a device based on the transition of superconductors between a non-dissipative state (near zero resistance) and a dissipative state (non-zero resistance). This superconductor transition is particularly characterized by the presence of a critical current, beyond which the device switches into a dissipative state. The limiter according to the invention is distinguished from limiters intended for electrical distribution networks where the current limitation necessities only last several hundred milliseconds. On the other hand; with reference to the invention, the operation in limitation must be able to last several minutes or even several hours. The thermal exchanges that were disregarded in this type of application here gain great importance.

In fact, these time conditions have a direct influence on the exchanges between the superconductor and the cooler (cryogenic fluid or cold spot). These exchanges are almost negligible in the case of a network limiter (practically adiabatic regime) while exchanges gain great importance in the invention and enable the sizing of the limiter to be optimized. Furthermore, it will be noted that the limiters utilized in distribution networks limit the current to a peak value; conversely, the role of the limiter according to the invention is really to lower (and not to level) the current when it has reached a critical value.

Thanks to the invention, the superconducting switch controlled by a heater system according to the prior art is advantageously replaced by a superconducting limiter not necessitating any external control to switch into resistive mode during coil charge or discharge or during rapid discharge. Such a configuration presents a considerable advantage in terms of operation security inasmuch as the effectiveness of the rapid discharge in case of quench is no longer dependent on opening the switch controlled by its external control; The limiter according to the invention intrinsically allows switching from its conducting state to a resistive state during three modes of operation that are the charge or discharge of the coil, the normal operation mode and the rapid discharge of the coil in the protection resistance upon detecting a magnet quench.

The advantages of a current limiter with relation to a controlled superconducting switch are therefore as follows:

- the limiter does not disturb the charge or discharge of the magnet since it intrinsically reacts without external action; losses in the limiter in these regimes may be maintained at a low level by an adapted sizing of the limiter,
- by naturally and automatically limiting the current during rapid discharge of the magnet, the limiter does not modify the protection of the magnet,
- the operation of the limiter is automatic, it does not necessitate a detection circuit or an originator.

The system according to the invention may also present one or more of the characteristics below, considered individually or according to all technically possible combinations:

- said limiter is formed of a superconductor wire comprising a plurality of elementary superconducting filaments integrated into a resistive matrix;
- the superconductor wire may also be constituted from the deposition or several depositions of a superconducting material on a resistive substrate (for example a superconducting material made from ceramics such as YBaCuO, for example);
- the resistivity of said resistive matrix is greater than $10^{-7}$ Ω·m;
- said resistive matrix is made of CuNi;
- said elementary filaments are made from NbTi or from a material known as "high Tc" material, such as $MgB_2$;
- said resistance mounted in series with said limiter presents a value 10 to 1000 times greater than that of the residual resistance of the magnet;
- the superconductor wire forming said limiter is chosen such that its critical current is greater than $(R'_2/R'_1)I_{op}$ where $R'_2$ designates the value of said residual resistance of said magnet, $R'_1$ designates said second resistance mounted in series with said limiter and $I_{op}$ designates the current circulating in said first branch during said normal operation mode;
- the length of the superconductor wire forming said limiter is determined such that the temperature of said superconductor wire always remains less than or equal to a predetermined maximum temperature value $T_{max}$;
- said length of said superconductor wire is less than a length l determined by $$l = U_0\sqrt{\frac{\tau}{2\int_{T_{He}}^{T_{max}} C_p(T)\rho(T)dT}}$$

where S, $C_p$ and p are respectively the section, the volume specific heat and the resistivity of said wire with its superconducting strands and its matrix, $T_{He}$ designates the initial temperature of the cryogenic bath of said limiter, U0 designates the initial voltage at the terminals of said magnet before said rapid discharge into said protection resistance and t designates a time constant given by the ratio L'/R'3, L' representing said coil inductance and R'3 representing said protection resistance;

- said limiter is formed by a superconductor wire surrounded by an insulating layer whose thickness is determined such that the power deposited in the cryogenic bath of said limiter is less than a predetermined value;
- said limiter and said magnet are located in separate cryogenic baths;
- said limiter is formed by a coil in two layers, the two layers being wound in opposing directions and being placed either in parallel or in series, this in the object of obtaining a limiter with the lowest possible inductance;
- the system according to the invention comprises control means to cause said limiter to switch from its low-resistance state to its high-resistance state;
- said control means are formed by a heating element;
- said control means comprise means for generating a signal of alternating current circulating in said limiter such that said limiter switches from its low-resistance state to its high-resistance state, particularly under the effect of the elevation of temperature driven by the circulation of said alternating current;
- said means to generate an alternating current signal comprise voltage transformer means receiving in input the voltage from the electrical network and providing in output a lowered voltage at the same frequency as the voltage of the electrical network;
- the frequency f of said alternating current signal is chosen sufficiently high so that the alternating current is blocked by the inductance of the coil;
- said control means comprise means for generating a current greater than said breaking current enabling said limiter to be caused to switch;
- said means for generating a current greater than said breaking current enabling said limiter to be caused to switch are formed by means generating a current pulse of a sufficient intensity and duration to cause said limit to switch;
- said means for generating a current greater than said breaking current enabling said limiter to be caused to switch are integrated into said power supply;

Another object of the present invention is a method of adjusting the current in a magnet included in a system according to the invention comprising the following steps, considered in any order:

- generation of a current ramp with a setting set to the new current value to be reached in the magnet;

generation of a current pulse in which the duration and intensity are such that said limiter switches in its high-resistance state.

Advantageously the method according to the invention comprises a step of generating a current slot that follows the step of generating said current pulse, the value of the current in this slot being equal to the sum of the current circulating in said protection resistance and of the current circulating in said limiter when it is in its high-resistance state.

Other characteristics and advantages of the invention will clearly emerge from the description given below, for indicative and in no way limiting purposes, with reference to the attached figures, among which:

Figure 5:
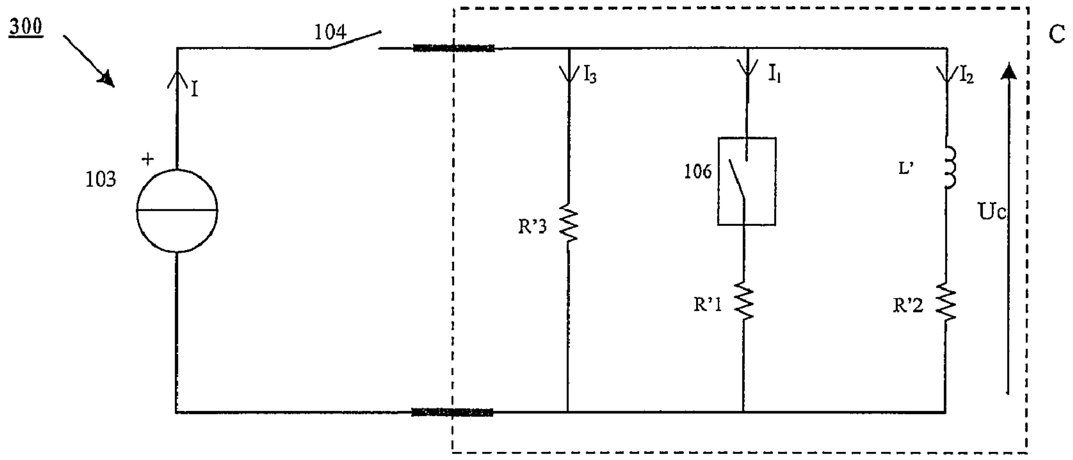
FIG. 5 is a schematic representation of a system according to the invention incorporating control means to cause the limiter to switch from its low-resistance state to its high-resistance state according to a second embodiment.
Figure 6:
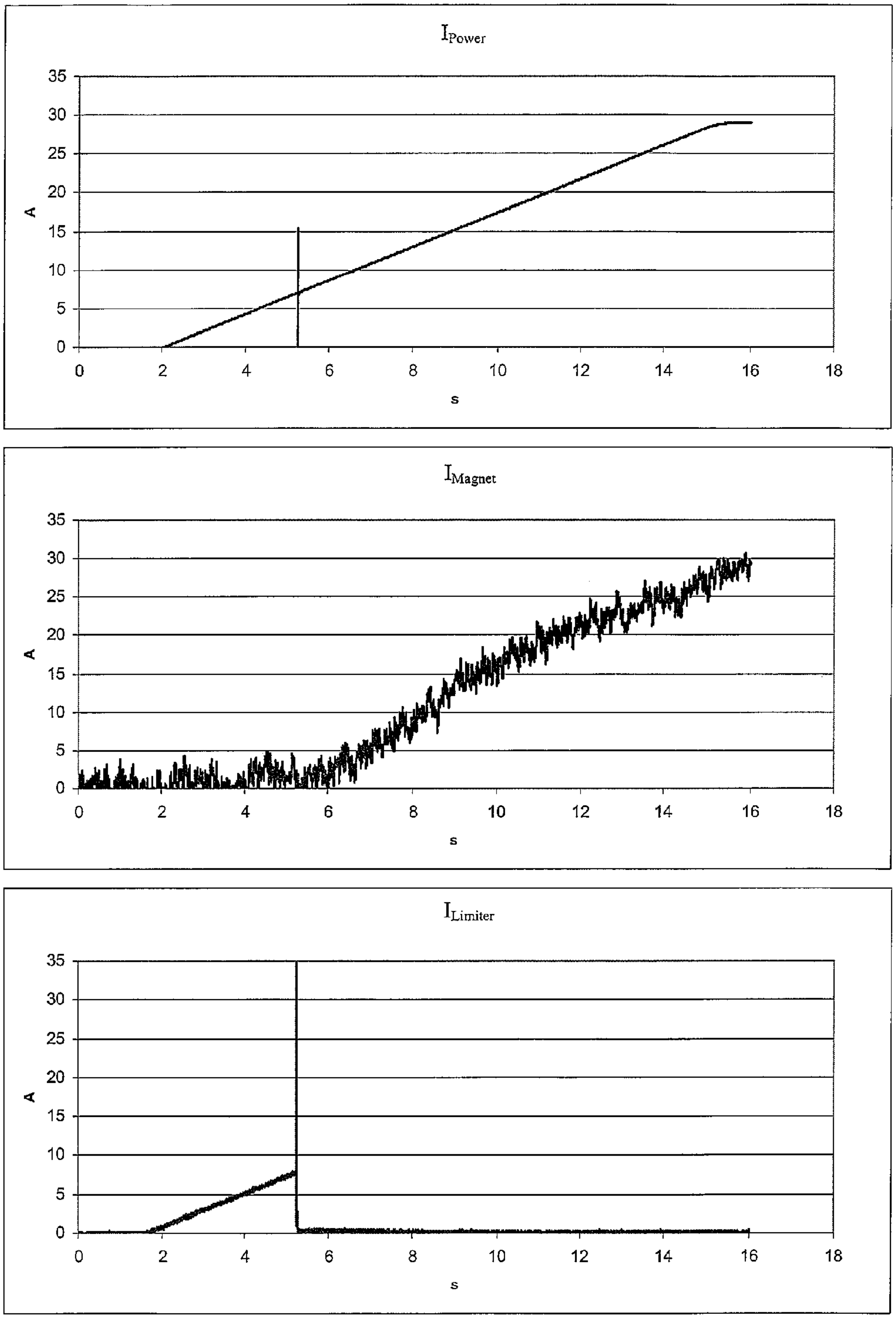

FIG. 6 respectively represents the evolution of the power from the power supply, the current in the magnet and the current in the limiter as a function of the time by utilizing a system such as represented in FIG. 5.

In all figures, common elements bear the same reference numbers.

Figure 1:
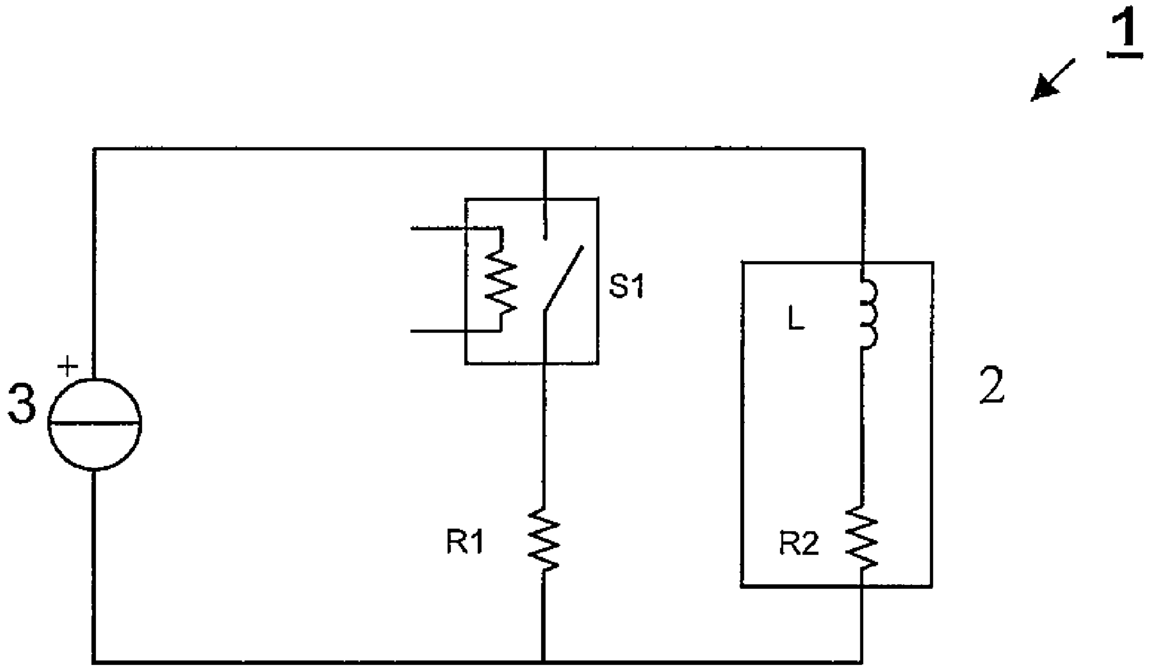
FIG. 1 is a schematic representation of a first circuit according to the prior art.
Figure 2:
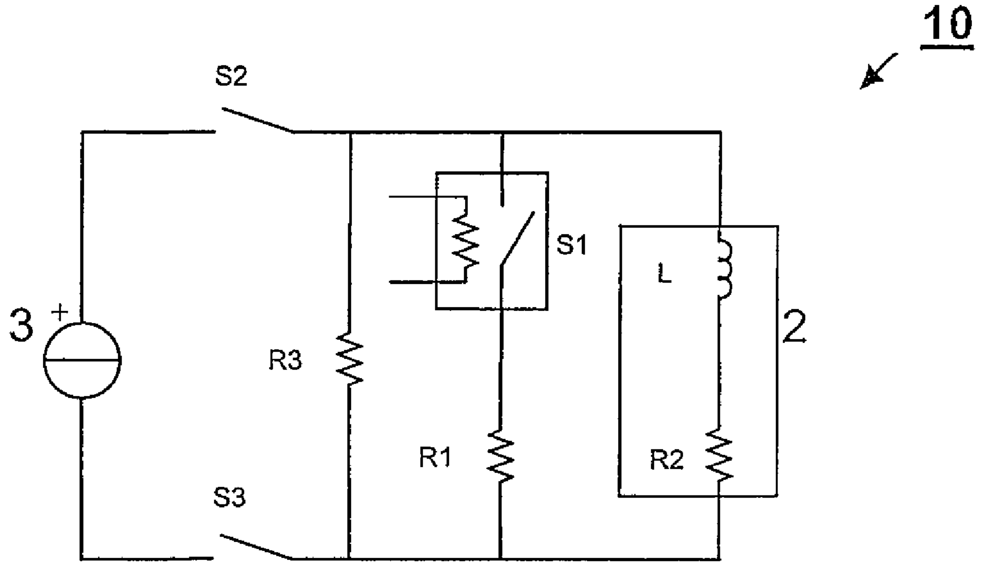
FIG. 2 is a schematic representation of a second circuit according to the prior art.

FIGS. 1 and 2 have already been described with reference to the prior art.

Figure 3:
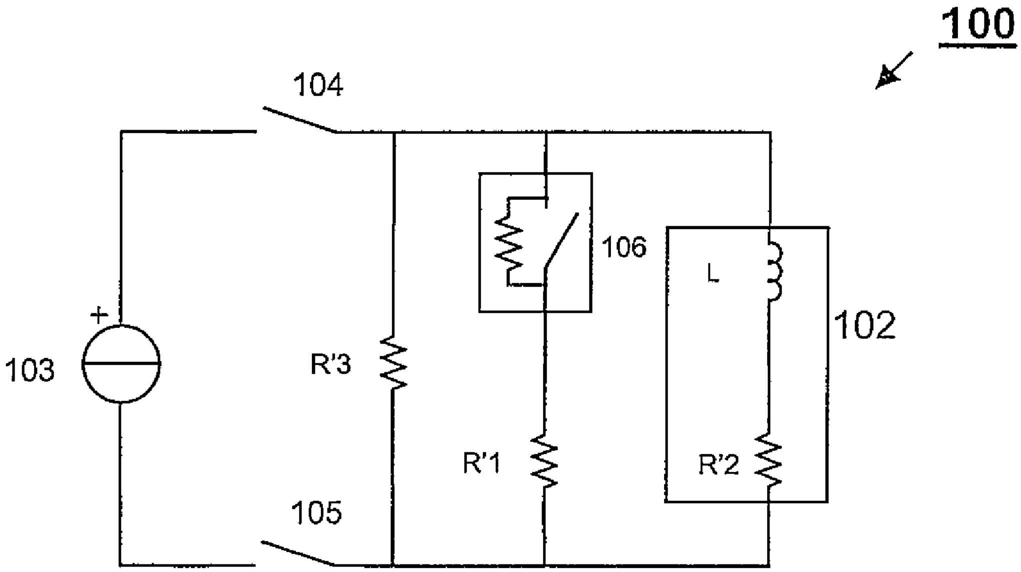
FIG. 3 is a schematic representation of a system according to the invention.

FIG. 3 is a schematic representation of a system 100 for creating a magnetic field according to the invention.

The system 100 comprises:

a first branch comprising a superconducting electromagnet 102 formed by a coil inductance L in series with a resistance R'2 representing the residual resistance of the magnet preventing operation in persistent mode, a second branch formed by a protection resistance $R'_3$ located in the cryostat chamber of the magnet or outside the chamber at ambient temperature a third branch formed by a current power supply 103 mounted in series with a cut-off member 104 (and possibly a redundant cut-off member 105), a fourth branch formed by a superconducting current limiter 106 in series with a resistance $R'_1$.

The superconducting limiter 106 is composed of a superconductor wire formed by a plurality of elementary superconducting filaments integrated into a resistive matrix, the superconductor wire may also be constituted of the deposition of a superconducting material on a resistive substrate; Later in the description we will come back to the choice of the material for making the resistive matrix.

The limiter 106 is characterized by two currents: The limitation breaking current Io and the recovery current Ir.

The breaking current represents the current beyond which the limiter develops high resistance that limits the current. This current is close to the critical current Ic characteristic of the superconducting material and is defined by the current for which the conductor develops a given electrical field (10 uV/m or 100 uV/m).

The recovery current is the thermal equilibrium current of the conductor with its environment. This current is reached after a rather long time (on the order of some seconds) and is not a conventional limiter parameter. It is defined by the characteristics of the conductor, particularly its resistance per unit length, and the cooling conditions (thickness of the insulator surrounding the limiter and thermal conductivity of the limiter).

Three phases of operation of the limiter may distinguished for the relevant application:

the slow charge (or discharge) of the magnet 102 constitutes a first embodiment that may be very long (several hours). During this embodiment, the cut-off members 104 and 105 are closed. At the start of this operation, limiter 106 transits to its high-resistance state and the current is quickly established at its recovery current Ir. The power dissipated in the limiter is equal to $|V_o|I_r$ where $V_o$ is the charge or discharge voltage. The sizing of the limiter, particularly its thermal insulation, enables its recovery current to be adapted and enables the power dissipated in the current rising and lowering phases to be adjusted. By way of example, by considering a magnet presenting an inductance of L'=300H under a voltage of $V_o$=10 V, if one wishes to reach a rated current $I_N$=1500 A, we get by doing the approximation that the current rise in the magnet is linear:

$$V_0 = L\frac{dI_N}{dt} \Rightarrow \Delta t = \frac{LxI_N}{V_0} = 12{,}5 \text{ heures.}$$

During this period, it is important that the limiter 106 does not exchange too much energy with the helium bath of the cryostat in which it is found.

A second operation phase is formed by the nominal mode or normal mode of operation. In this case, the cut-off members 104 and 105, are closed and this mode of operation corresponds to the current steady state in magnet 102. The power supply 103 remains connected to magnet 102. The current ΔI that traverses the limiter 106 is a small fraction of the operational current Iop traversing coil L'. This current ΔI is a function of the $R'_2/R'_1$ ratio. In a first approximation, we have $\Delta I=(R'_2/R'_1)I_{op}$. Of course, ΔI must be less than the breaking current Io of limiter 106 so that limiter 106 presents a low resistance.

The third mode of operation relates to the rapid discharge of the magnet, in case of a quench type transition. This phase ensures protection of the magnet when current is drained from the magnet in the protection resistance R'3. In this case, at least one of the cut-off members 104 or 105 is open. This mode is characterized by a high voltage (several hundreds to thousands of volts) at the terminals of the magnet for rapidly discharging the current and thus limiting the temperature rise of the superconducting conductor that is found in the normal state. The magnet is then discharged in the protection resistance R'3. During this phase, limiter 106 automatically and naturally develops a high resistance and limits the current in the fourth branch comprising resistance $R'_1$ to a value much less than the current that circulates in protection resistance R'3. This phase is sensitive since protection of the magnet depends on it. Limiter 106 presents a very safe characteristic from this point of view since the worst defect for the limiter is its destruction that leads to infinite equivalent resistance and therefore to protection of the magnet. Even if the discharge time is much shorter here (on the order of some minutes) than the charge time mentioned above with reference to the first embodiment, the voltage applied to the limiter 106 terminals is very high and leads to a much higher limiter 106 temperature than in charge mode.

The three modes of operation described above enable a method of sizing the limiter 106 to be defined, comprising the following steps:

Step 1: The value of resistance. $R'_1$ is defined as a function of the value of residual resistance $R'_2$ of the magnet in a ratio from 10 to 1000.

Step 2: so as to not cause the limiter 106 to transit to a high impedance during normal operation mode, a superconductor wire is chosen presenting a critical current $I_c$ greater than $(R'_2/R'_1)\ I_{op}$.

Step 3: as we already mentioned above, the maximum temperature $T_{max}$ seen by limiter 106 is produced during the rapid discharge phase of the magnet 102 in the protection resistance R'3. The sizing of limiter 106 requires the choice of this maximum admissible temperature, $W_{max}$, on the limiter 106 in case of discharge of the magnet 102.

Step 4: It is important that limiter 106 does not exchange too much energy with the helium bath, particularly during magnet 102 charging and discharging operations with power supply 103. Consequently, sizing of limiter 106 also requires the choice of the maximum admissible power on the cryogenic bath, $W_{max}$, during magnet charging and discharging operations.

Step 5: This step aims to calculate the length of the wire that is strictly necessary to maintain the wire at a temperature less than the $W_{max}$ temperature set at step 3 (during the rapid discharge of magnet 102). The voltage at the terminals of the magnet 102, U(t), and thus of limiter 106, is provided by the following relation:

$$: U(t) = U_0 e^{\frac{t}{\tau}}$$

where τ is a characteristic time constant of discharge given by the ratio $L'/R'_3$. In an adiabatic hypothesis where any transfer of heat between limiter 106 and the helium bath is disregarded, the heat produced by the joule effect is absorbed by the wire itself. In addition, by supposing that the rate of the resistive front that makes the superconductor wire transit is infinite, the following relation is obtained:

$$\frac{\left(U_0 e^{\frac{-t}{\tau}}\right)^2}{\frac{l}{S}\rho(T)} = SlC_p(T)\frac{dT}{dt}$$

where l, S, $C_p$ and p are respectively the length, section, volume specific heat and resistivity of the wire with its superconducting strands and matrix. Thus, if one very conservatively disregards the thermal exchange between the helium bath and limiter 106, the maximum wire length that it is advantageous to give to the limiter is given by the following formula (obtained by integrating the previous relation):

(Relation 1)

$$l = U_0 \sqrt{\frac{\tau}{2\int_{T_{He}}^{T_{max}} C_p(T)\rho(T)dT}} \qquad \text{(Relation 1)}$$

Of course, it should be noted that the previous calculation gives a maximum value of the wire length (connected to the adiabatic hypothesis); a shorter wire length thus also responds to temperature requirements. A longer length is also possible from the technical point of view, but is not very interesting from the economical point of view.

Step 6: This step aims to determine the thermal insulation necessary on limiter 106 to limit the power deposited on the bath. This insulation is characterized by the thermal flux per wire unit length, $w_{insulation}$, between the helium bath and the limiter 106 once the steady state is established. During charges and discharges of magnet 102, the voltage at the terminals of the limiter is constant and imposed by power supply 103, $U_{Alim}$. The thermal equilibrium between the bath and the limiter is thus written $$\frac{U_{Alim}^2}{R_{lim} l_{trans}} = W_{isolation} l_{trans} = W_{max}$$

where $R_{lim}$ is the resistance per wire unit length and $I_{trans}$ is the length of the wire transited in the limiter once thermal equilibrium has been reached. For a fixed power voltage, the length of the wire transited is thus imposed by the insulation. The nature and the thickness of the insulation may therefore be adjusted such that the power deposited on the bath is less than $W_{max}$.

This relation also shows that it is the voltage provided by the power supply that maintains the limiter open, $I_{trans}$ non zero, during charge and discharge operations.

The fact of placing the current limiter 106 in the liquid helium results in that the limiter is, for example, composed of a superconductor wire formed by a plurality of elementary filaments in niobium-titanium (NbTi) in which the transition temperature is equal to 9.5K if it is subjected to zero magnetic flux density and in which the diameter is preferentially less than 120 mm integrated into a resistive matrix. The resistive matrix is preferably highly resistive so as to reduce the length of the wire (as we mentioned above, the maximum wire length is inversely proportional to the resistivity of the wire and its matrix): A highly resistive matrix thus reduces the bulk of the limiter. The matrix may, for example, be made from cupronickel (CuNi). The fact of choosing a highly resistive matrix also accelerates the superconducting transition and enables high resistance after transition. In fact, as the resistivity of cupronickel is very high (approximately $0.4.10^{-6}$ Ω·m) in comparison with a copper matrix ($10^{-10}$ Ω·m at 4.2 K) for example, the limitation, will result in improvement.

One may also place the limiter at a higher temperature and utilize in this case a high Tc type superconducting material (at a higher critical temperature) such as magnesium diboride ($MgB_2$) or a ceramic type superconductor, such as YBaCuO, for example.

The presence of current limiter 106 near magnet 102 that has the objective of being the most stable layout possible requires the limiter to have the lowest possible inductance so that variations in current circulate in the branch of the limiter and not in the magnet. In addition, the lower the inductance of limiter 106, the faster the current limitation. The wire length must therefore be disposed such that the self inductance of limiter 106 is the lowest possible to have a reduced response time, to not induce overvoltages and to ensure good stabilization. A solution consists of utilizing a coil in two layers, the two layers being wound in opposing directions (two coils of the same length interlinked and separated by in insulator to avoid dielectric breakdown between the two coils).

According to a first configuration, the two layers are placed in parallel at each end: This configuration is interesting since it distributes the voltage over a large distance (the distance between the two ends) and prevents dielectric breakdown.

According to a second, configuration, the two layers are placed in series.

In the following, we are going to apply the sizing method described above to a superconducting magnet producing a field of 7 tesla formed by a superconducting coil of Niobium-Titanium (integrated into a copper matrix) bathed in liquid helium at atmospheric pressure (i.e. at a temperature of 4.2 K). The following numerical values (given to the temperature of 4.2 K) utilized are given in the following table 1:

TABLE 1

| | | |
|---|---|---|
| Rated current of the magnet | $I_{op}$ | 400 A |
| Residual resistance of the magnet | $R'_2$ | 10 μΩ |
| Inductance of the magnet | L' | 0.68 H |
| Protection resistance | $R'_3$ | 0.5 Ω |

By carrying out the six steps mentioned above:

Step 1: Choice of the stabilization resistance $R'_1$ at 1 mΩ to ensure a $R_1/R_2$ ratio of 100.

Step 2: Choice of an uninsulated superconductor wire with a diameter of 0.2 mm composed of superconducting filaments in NbTi of 30 um in diameter in a CuNi matrix with 30% Ni by weight. The ratio of the section of Cu on the section of NbTi is 1.2 which ensures a critical current greater than $(R'_2/R'_1)I_{op}$, or 4 A.

Step 3: Choice of the maximum admissible temperature $T_{max}$ at 100 K.

Step 4: Choice of the maximum admissible power on the cryogenic bath $W_{max}$ at 1 W.

Step 5: By applying relation 1, a maximum wire length of approximately 250 m is found. As we have already specified, this value is greatly increased; thus, tests demonstrate than a 50 m length is sufficient.

Step 6: The limiter is insulated from the helium bath, for example, with an insulating resin (epoxy, for example) presenting a thickness of 1 mm. If necessary, the thickness of the insulating layer may be increased in order to reduce the power dissipated to a value of less than the desired threshold value $W_{max}$ in steady state with the limiter in its high impedance state.

It will be noted that the invention applies to both a configuration in which the magnet 102 and the limiter 106 are in the same cryogenic bath and to a configuration in which magnet 102 and limiter 106 are in separate baths; in the latter case, a possible application consists of utilizing two helium baths, one containing superfluid helium at a temperature of between 1.7 and 2.2 K (on the order of 1.8 K) for the needs of magnet 102 and the other containing liquid helium at 4.2 K, the two baths being interconnected by a channel of reduced section according to the "Claudet bath" principle. Such a configuration allows easier access to limiter 106 separated from magnet 102.

In the case of certain MRI or NMR, it may sometimes be necessary to open the limiter in a controlled manner, for example to adjust the current circulating in the magnet. With a limiter without opening control, this adjustment may cause a problem since it would be necessary to increase the current in the limiter up to the limiting current threshold, that is then injected into the magnet, and then to adjust the current value once the limiter is open. For magnets sized very close to their critical values, or in which the protection is sensitive to rapid current variations, such a constraint may prove to be prohibitive.

A first solution consists of adding a heater allowing the limiter to be placed temporarily in "open" mode, without necessarily degrading the security connected to the intrinsic operation of the limiter.

Figure 4:
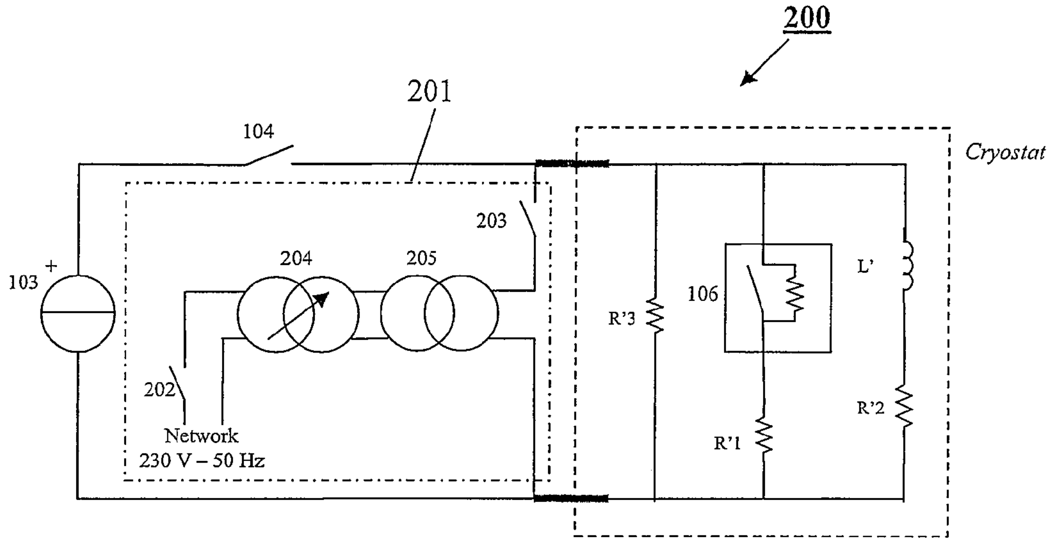
FIG. 4 is a schematic representation of a system according to the invention incorporating control means to cause the limiter to switch from its low-resistance state to its high-resistance state according to a first embodiment.

Advantageously, a second solution consists of injecting via the magnet current leads (in the coil of the magnet and the protection branches situated in parallel with cut-off members 104 and 105), a sinusoidal alternating current or impulsive current that overlaps the running current. The frequency of this current is chosen sufficiently high so that the alternating current is blocked by the inductance L' of the coil, such that the latter does not receive thermal energy likely to cause it to transit outside of the superconducting state. The frequency may, for example, be chosen so that more than 99.9% of this alternating current passes through the limiter. The transition of the limiter from its low impedance state to its high impedance state is obtained either by the elevation of the temperature driven by the circulation of said alternating current (elevation created by losses induced by the alternating current) or because the effective value of the alternating current exceeds the value of the breaking current of the limiter. In practice, a frequency equal to or greater than 50 Hz suffices for known applications. This alternating current may be generated by internal specific circuits designed for this purpose, or even externally to the power supply by a secondary power supply preferably situated in parallel with the main power supply. However, it is not contrary to the invention to produce this secondary power supply by a device placed in series with the main power supply. An example of a system 200 for creating a magnetic field according to the invention incorporating a control device 201 generating such a signal is illustrated in FIG. 4.

System 200 is identical to system 100 of FIG. 3 with the difference that it comprises the control device 201 forming means for switching limiter 106 from its low-resistance state to its high-resistance state by enabling the generation of a sinusoidal current signal able to cause limiter 203 to switch and that it does not comprise a second redundant cut-off member 105.

The control device 201 comprises:

- an ELV (Extra-Low Voltage) step-down transformer 205 in which the short circuit current Icc is greater than the current necessary to cause limiter 106 to switch and the output voltage is sufficient for maintaining the limiter 106 in the resistive state considering the line resistances (Icc=38 A with Ucc=0.80 V),
- a variable autotransformer 204 enabling the voltage of the network (230 V) to be adjusted to obtain these two short circuit current and output voltage sufficient for maintaining the limiter 106 in its resistive state values,
- a switch 203 enabling the control device 201 to be connected to the circuit of the magnet during the operating phase.
- a switch 202 enabling the control device 201 to be connected to the electrical network 230V/50 Hz (or 115V/60 Hz) for its implementation.

We are going to illustrate the operation of control device 201 in the case of a superconducting magnet with inductance L'=0.68H giving a nominal magnetic field of 7 T for a current of 400 A. A resistance $R'_2$ of 10 μΩ (resistance simulating the resistive connections of a superconducting magnet) is mounted in series with coil L'.

Switch 203 being closed, the control device 201 is implemented by the closing of switch 202 (connection to network 230V/50 Hz).

In a first phase; the autotransformer 204 is adjusted to a voltage of 230 V.

As 2πfL' is greater than the resistance of limiter 106, the current only circulates in the mesh of limiter 106 until the transition of the latter. It will be noted that in the example cited here, limiter 106 transits since the short circuit current Icc (corresponding to the effective value of the sinusoidal current provided by the ELV transformer 205) is greater than the breaking current necessary for causing limiter 106 to transit. However, one may also control the opening of limiter 106 if one chooses a voltage provided by the ELV transformer 205 such that the current circulating in the limiter not only exceeds the breaking current, but leads to an elevation in temperature going beyond the critical temperature enabling limiter 106 to be caused to switch: Such a solution necessitates working at higher operating frequencies.

In a second phase, limiter 106 being resistive, the current traversing it is weak (some tens of mA) and the voltage necessary to maintain the transited limiter 106 is therefore some volts (approximately 1 V in output of autotransformer 205). This voltage will make a current of approximately 2 A circulate in the discharge resistance R'3 and a very weak alternating current circulate in the mesh of the coil, inversely proportional to its inductance L'. The alternating current does not modify the main direct current in the coil.

In a third phase; one may increase (or reduce) the main current in the coil by modifying the current provided by power supply 103. During this phase, the switch 203 is either closed to maintain limiter 106 open or open (in this case, the current that maintains limiter 106 open is provided by power supply 103 for the time necessary to modify the current). The open switch 203 enables adjustments in current to be done without being disturbed by alternating signals.

In a fourth phase, as soon as the necessary adjustments have been made, limiter 106 becomes superconducting again following the opening of switch 203. In fact, without the provision of external energy, limiter 106 typically finds the temperature of the cryogenic bath after some seconds. The time to return to the closed state depends above all on the level of thermal insulation between the limiter and the cryogenic bath.

It will be noted that the example above relates to a sinusoidal signal but that other types of alternating signals (square, triangular, pulse signals, etc.) may also be utilized.

One may also directly utilize the main power supply 103 to generate a current pulse of some milliseconds at a current value greater than the breaking current of the limiter 106 sufficient for causing the latter to transit.

FIG. 5 illustrates the implementation of such a control on a circuit 300 substantially identical to circuit 100 from FIG. 3 (with the difference that it does not comprise switch 105).

The circuit 300 presented in FIG. 5 is comprised of superconducting magnet of inductance 0.68H giving a nominal magnetic field of 7 T for a current $I_2$ of 400 A. The resistance R'2 simulating the resistive connections of the superconducting magnet mounted in series with coil L' has a value of 10 μΩ. A power supply 103 (1000 A-10 V) regulated in current is connected to the charge by closing switch 104.

As we already explained with reference to FIG. 1, to protect the magnet, resistance R'3 (here of a value equal to 0.5 ohm) is mounted in parallel to the branch of the magnet. In the case of circuit 300, resistance R'3 is inside cryostat C. During a serious problem, switch 104 is open, leading to the rapid discharge of energy from the magnet in the protection resistance R'3. Limiter 106 and stabilization resistance R'1 (here equal to 1 mΩ) are mounted in parallel on the magnet. The current $I_1$ in this branch must be such that $R'_2 \cdot I_2 = R'_1 \cdot I_1$ in steady state, where $I_2$ designates the current circulating in inductance L'.

Power supply 103 comprises means to generate a current pulse for a sufficient duration (here >5 ms) and amplitude Ip (here >40 A) greater than the breaking current enabling limiter 106 to switch from its low-resistance state to its high-resistance state. A solution to generate this pulse consists of intervening in the control loop of power supply 103. One may also utilize an auxiliary power supply enabling this pulse to be generated.

Power supply 103, regulated in current, generates a current ramp (with a di/dt here chosen of between 2 and 10 A/s). A minimum ramp value is imposed so that the voltage Uc at the terminals of the magnet is sufficient to maintain limiter 106 in its resistive mode.

In steady state condition, the following relation may be written:

$$U_c = L'dI_2/dt + R'_2 I_2 = R'_3 I_3 = (R'_1 + R'_1 O) I_1$$

where $R'_1O \approx 10\Omega$ designates the resistance of the superconducting limiter 106 in its high-resistance state.

Therefore, for a di/dt value of 2 A/s, the following values are obtained:

$$U_c \approx 0.68 \times 2 = 1.36 \text{ V}$$

$$I_3 = 1.36/0.5 = 2.72 \text{ A}$$

$$I_1 = 1.36/10 = 0.136 \text{ A.}$$

It should be noted that, just after the switching of limiter 106 in its resistive state, the current will essentially switch in resistance R'3. Consequently, the current rise 12 in the magnet is established with a time constant ramp close to L'/R'3 (i.e. there is a certain delay before current $I_2$ in the magnet catches up to the current ramp issued by power supply 103). Furthermore, at the end of the ramp, the current finishes being established in the magnet with the same time constant. Such behavior of current $I_2$ may lead to two disadvantages:

on the one hand, transitional phases with durations all the longer as the inductance L' of the magnet is higher and, on the other hand, the risk that the voltage Uc is too low during the first seconds to maintain the limiter 106 in resistive mode, particularly for high inductance magnets.

An effective solution to mitigate these disadvantages consists of generating a current Ic slot by power supply 103 immediately following the limiter 106 switching pulse Ip, the value of Ic being chosen such that $Ic = I_3 + I_1$. This current slot will have the same duration as the rise ramp (i.e., corresponding to the magnet adjustment time).

Two other solutions may also be utilized:

carry out charging of the magnet with constant voltage at the terminals of the magnet with a voltage regulated power supply and a di/dt value of less than 10 A/s. This solution necessitates a specific power supply for charging and is not particularly adapted for small current adjustments.

mount a diode in opposition in series with R'3 which enables current $I_3$ to be cancelled. In this case, the electrical current is no longer symmetrical and does not function for descents in current.

In the following, we are going to describe the steps enabling passage (i.e., adjustment) of a current of 400 A to a current of 410 A in the magnet, the current ramp always being 2 A/s:

we begin by cancelling the stabilization current $I_1$ by passing the power supply 103 setting to 400 A;

after some seconds (typically 2 s), a new current setting of 410 A is set;

a 40 A pulse is generated for some milliseconds (typically 10 ms) to make limiter 106 resistive;

immediately after the pulse, a current slot at a current Ic value such that $Ic=I_3+I_1=2.72+0.14=2.86$ A is generated.

as soon as the power supply 103 current reaches 410 A (typically after 5 s), the current slot is stopped (Ic=0). The current in the magnet is then 410 A and the currents $I_1$ and $I_3$ are practically zero (<10 mA). Limiter 106 is cooled and becomes superconducting again in some seconds, thus recovering its low-resistance state.

after some seconds, a stabilization current $I_1$ equal to 4.1 A is injected into resistance $R'_1$ chosen such that $R'_1I_1=R'_2I_2$, the injection being done by a new setting given to the power supply at 414.1 A.

By way of illustration, a rise from 0 to 30 A (the principle would be identical when passing from 400 to 410 A) was carried out experimentally by applying the steps stated above (without the slot generation step). This rise is illustrated in FIG. 6 that represents the evolution as a function of time of respectively the current from power supply 103, the current in the magnet and the current in limiter 106. Current and time scales are the same for the three curves. The following steps may be distinguished:

1. at t=2s (value purely illustrative corresponding to the start of the ramp), a charging setting of 30 A is set to the power supply: Thus the start of a current ramp is observed for the power supply curve.
2. The limiter being on, it has the lowest impedance of the circuit; the current thus flows in its branch and the limiter curve follows the power supply current ramp.
3. A current pulse (35 A) is then sent on the power supply that exceeds the breaking current of the limiter. It is observed that the pulse is also seen by the limiter.
4. The limiter passes in resistive mode and the current essentially switches in the protection resistance R'3. The rise in current in the magnet is established with a time constant ramp close to L'/R'3. This transitional phase may be avoided by utilizing a current slot such as mentioned above. The current in the magnet then catches up with the current ramp issued by the power supply.
5. During the entire continuation of the current ramp, the limiter remains in resistive mode since voltage is maintained at its terminals and charging of the magnet thus continues normally.
6. Once the desired current setting has been reached in the magnet, the limiter becomes on again (not represented in FIG. 6).

The noise observed on measuring the current in the magnet is connected to the measurement noise due to the very low resistance value ($R_2=10\ \mu\Omega$) utilized for measuring this current.

It will be noted that, in the example given, the delay is significant (approximately 3 s) between the start of the ramp and the pulse; this delay only sets out to illustrate the theory of operation but may be reduced to zero.

The invention claimed is:

1. A system for creating a magnetic field including:

a first branch comprising a superconducting magnet configured to produce said magnetic field, said magnet being formed by a coil inductance (L') in series with a residual resistance (R'2);

a second branch comprising a protection resistance (R'3);

a third branch comprising a power supply;

a fourth branch formed by a resistance (R'1) mounted in series with a current-limiting superconducting device switching from a low-resistance state to a high-resistance state when the current passing therethrough exceeds a breaking current, said superconducting device having an inductance at least $10^5$ times less than that of the coil (L'), and said first, second, third and fourth branches being mounted in parallel, said system presenting at least three modes of operation:

a first mode of operation, corresponding to a charge mode or discharge mode of the magnet, in which:

said power source is connected to said magnet so as to increase or reduce the current in the magnet, said current limiter being in its high-resistance state;

a second mode of operation, corresponding to a normal mode of operation, in which:

said power source is connected to said magnet, said limiter being in its low-resistance state;

a third mode of operation, corresponding to the rapid discharge mode of the magnet in said protection resistance (R'3), in which:

said power source is disconnected from said magnet, said limiter being in its high-resistance state;

wherein activation of the state of said limiter in said three operation modes is done in a passive manner without resorting to an external command.

2. The system according to claim 1, wherein said limiter is formed by a superconductor wire comprising a plurality of elementary superconducting filaments integrated into a resistive matrix.

3. The system according to claim 1, wherein said limiter is formed by a superconductor wire constituted of the deposition or of several depositions of a superconducting material on a resistive substrate.

4. The system according to claim 2, wherein the resistivity of said resistive matrix is greater than $10^{-7}\ \Omega\cdot$m.

5. The system according to claim 4, wherein said resistive matrix is made of CuNi.

6. The system according to claim 1, wherein said limiter is formed by a superconductor wire comprising a plurality of elementary superconducting filaments made of NbTi or of a material known as "high Tc" material, such as $MgB_2$.

7. The system according to claim 1, wherein said resistance ($R'_1$) mounted in series with said limiter presents a value 10 to 1000 times greater than that of the residual resistance of the magnet (R'2).

8. The system according to claim 1, wherein the superconductor wire forming said limiter is chosen such that its critical current is greater than (R'2/R'1)Iop where R'2 designates the value of said residual resistance of said magnet, $R'_1$ designates said resistance mounted in series with said limiter and Iop designates the current circulating in said first branch during said normal operation mode.

9. The system according to claim 1, wherein the length of the superconductor wire forming said limiter is determined such that the temperature of said superconductor wire always remains less than or equal to a predetermined maximum temperature value $T_{max}$.

10. The system according to claim 9, wherein said length of said superconductor wire is less than a length l determined by the following relation:

$$I = U_0 \sqrt{\frac{\tau}{2\int_{T_{He}}^{T_{max}} C_p(T)\rho(T)dT}}$$

where S, Cp and p are respectively the section, the volume specific heat and the resistivity of said wire with its superconducting strands and its matrix, $T_{He}$ designates the initial temperature of the cryogenic bath of said limiter, $U_0$ designates the initial voltage at the terminals of said magnet before said rapid discharge into said protection resistance ($R'_3$) and t designates a time constant given by the ratio $L'/R'_3$, L' representing said coil inductance and R'3 representing said protection resistance ($R'_3$).

11. The system according to claim 1, wherein said limiter is formed by a superconductor wire surrounded by an insulating layer whose thickness is determined such that the power deposited in the cryogenic bath of said limiter is less than a predetermined value.

12. The system according to claim 1, wherein said limiter and said magnet are located in separate cryogenic baths.

13. The system according to claim 1, wherein said limiter is formed by a coil in two layers, the two layers being wound in opposing directions and being placed either in parallel or in series.

14. The system according to claim 1, wherein the system comprises a controller to cause said limiter to switch from its low-resistance state to its high-resistance state.

15. The system according to claim 14, wherein said control means are formed by a heating element.

16. The system according to claim 14, wherein said controller comprises a generator configured to generate a signal of alternating current circulating in said limiter such that said limiter switches from its low-resistance state to its high-resistance state.

17. The system according to claim 16, wherein said generator to generate an alternating current signal comprise voltage transformer receiving in input the voltage from the electrical network and providing in output a lowered voltage at the same frequency as the voltage of the electrical network.

18. The system according to claim 16, wherein the frequency f of said alternating current signal is chosen sufficiently high so that said alternating current is blocked by the coil inductance (L').

19. The system according to claim 14, wherein said controller comprises a generator configured to generate a current greater than said breaking current enabling said limiter to be caused to switch.

20. The system according to claim 19, wherein said generator configured to generate a current greater than said breaking current enabling said limiter to be caused to switch are formed by a generator configured to generate a current pulse of a sufficient intensity and duration to cause said limiter to switch.

21. The system according to claim 19, wherein said generator configured to generate a current greater than said breaking current enabling said limiter to be caused to switch are integrated into said power source.

22. A method of adjusting the current in a magnet included in a system according to claim 20 comprising:

generating a current ramp with a setting set to the new current value to be reached in the magnet;

generating a current pulse in which the duration and intensity are such that said limiter switches in its high-resistance state.

23. The method according to claim 1, comprising generating a current slot that follows the generating of said current pulse, the value of the current in this slot being equal to the sum of the current circulating in said protection resistance and of the current circulating in said limiter when it is in its high-resistance state.

* * * * *